(12) United States Patent
Morgan et al.

(10) Patent No.: US 10,458,342 B2
(45) Date of Patent: Oct. 29, 2019

(54) SYSTEM AND METHOD FOR CONTROLLING OPERATION OF A GAS TURBINE BASED POWER PLANT

(71) Applicant: General Electric Company, Schenectady, NY (US)

(72) Inventors: Rex Allen Morgan, Simpsonville, SC (US); James Tyson Balkcum, III, Taylors, SC (US); Stephen R. Watts, Greer, SC (US); Harold Lamar Jordan, Jr., Greenville, SC (US); Brad Wilson VanTassel, Easley, SC (US)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 14/488,723

(22) Filed: Sep. 17, 2014

(65) Prior Publication Data

US 2015/0081121 A1      Mar. 19, 2015

Related U.S. Application Data

(60) Provisional application No. 61/878,802, filed on Sep. 17, 2013.

(51) Int. Cl.
G05B 23/02      (2006.01)
F02C 9/00       (2006.01)
F01D 21/00      (2006.01)

(52) U.S. Cl.
CPC .............. *F02C 9/00* (2013.01); *F01D 21/003* (2013.01); *F05D 2260/80* (2013.01);
(Continued)

(58) Field of Classification Search
CPC ..... F02C 9/00; F01D 21/003; G05B 23/0283; F05D 2260/80; F05D 2270/11; F05D 2270/44
(Continued)

(56) References Cited

U.S. PATENT DOCUMENTS 6,636,813 B1 * 10/2003 Isobe .................... F01D 21/003
                                                          200/79
9,317,249 B2 * 4/2016 Moeckly .................. G06F 7/00
(Continued)

OTHER PUBLICATIONS

Search Report and Written Opinion for PCT/US2014/056047 dated Dec. 4, 2014.

*Primary Examiner* — Michael J Huntley
(74) *Attorney, Agent, or Firm* — Dority & Manning, P.A.

(57) ABSTRACT

A system for controlling a gas turbine power plant includes a plurality of sensors configured to transmit signals indicative of one or more operating parameters of the gas turbine, and a control system in electronic communication with each sensor. The control system is configured to compute cumulative wear for one or more hardware components of the gas turbine based at least in part on the signals. Instructions are inputted into the control system which indicates a desired operational mode for the gas turbine. The control system may then compute a hardware consumption rate based at least in part on the cumulative wear. The hardware consumption rate may then be displayed to an operator via a display device. The operator may use the hardware consumption rate to determine potential economic impact of operating the gas turbine at the desired operational mode.

20 Claims, 3 Drawing Sheets

(52) U.S. Cl.
CPC ...... *F05D 2270/11* (2013.01); *F05D 2270/44* (2013.01); *G05B 23/0283* (2013.01)

(58) Field of Classification Search
USPC ........................................................ 700/287
See application file for complete search history.

(56) References Cited

U.S. PATENT DOCUMENTS

| | | | |
|---|---|---|---|
| 2002/0013643 A1* | 1/2002 | Ishii ................... | G05B 23/0283 700/289 |
| 2009/0125207 A1* | 5/2009 | Nomura ................ | F02C 3/22 701/100 |
| 2010/0161196 A1 | 6/2010 | Goericke et al. | |
| 2011/0106510 A1* | 5/2011 | Poon .................. | G05B 23/0283 703/2 |
| 2011/0137575 A1* | 6/2011 | Koul .................. | G05B 23/0245 702/34 |
| 2011/0282500 A1* | 11/2011 | Long ..................... | G05B 17/02 700/287 |
| 2011/0296810 A1* | 12/2011 | Hardwicke ........ | G05B 23/0283 60/39.091 |
| 2012/0029839 A1* | 2/2012 | Ritter ................. | G05B 23/0283 702/34 |
| 2012/0283963 A1 | 11/2012 | Mitchell et al. | |
| 2012/0290104 A1* | 11/2012 | Holt ...................... | G06Q 10/00 700/29 |
| 2014/0088888 A1* | 3/2014 | Poon ..................... | F03B 15/00 702/34 |
| 2014/0163838 A1* | 6/2014 | Moeckly ................. | F02C 9/00 701/100 |
| 2014/0244133 A1 | 8/2014 | DeProsperis et al. | |
| 2015/0227658 A1* | 8/2015 | Persson ............. | G05B 23/0243 703/2 |

\* cited by examiner

SYSTEM AND METHOD FOR CONTROLLING OPERATION OF A GAS TURBINE BASED POWER PLANT

CROSS REFERENCE TO RELATED APPLICATIONS

The present application claims filing benefit of U.S. Provisional Patent Application Ser. No. 61/878,802 having a filing date of Sep. 17, 2013, which is incorporated by reference herein in its entirety.

FIELD OF THE INVENTION

The present invention generally involves a gas turbine based power plant. More specifically, the invention relates to a system and method for operating a gas turbine based power plant based at least in part on a hardware life consumption value.

BACKGROUND OF THE INVENTION

A turbomachine, such as a gas turbine, generally includes an inlet section, a compressor section, a combustion section that includes a plurality of combustors, a turbine section and an exhaust section. The inlet section cleans and conditions a working fluid (e.g., air) and supplies the working fluid to the compressor section. The compressor section progressively compresses the working fluid and supplies a high pressure compressed working fluid to the combustors where it is mixed with a fuel and burned in a combustion chamber to generate combustion gases having a high temperature and pressure. The combustion gases flow along a hot gas path into the turbine section where they expand to produce work. For example, expansion of the combustion gases in the turbine section may rotate a shaft connected to a generator to produce electricity.

Each combustor includes various hardware components. For example, a conventional gas turbine combustor may include one or more fuel nozzles, a combustion liner, a cooling flow sleeve, a transition duct, an impingement sleeve, a cap assembly and/or various mounting hardware such as brackets and radial compression or hula seals. The turbine generally includes various hardware components including stationary or stator vanes, rotatable turbine blades and rotor disks. Over time, various factors including thermal cycling, vibrations and/or pressure pulses within the gas turbine may result in hardware component degradation. As a result, regularly scheduled outages for inspection and repair must be executed, thus affecting machine availability.

Typically, gas turbines have control systems that monitor and control their operation. Conventionally, control systems execute various scheduling algorithms that adjust or control various effectors or gas turbine inputs such as fuel flow, inlet guide vane angles and other control inputs to provide safe and efficient operation of the gas turbine while governing various operational aspects of the gas turbine so as to meet power and efficiency objectives while simultaneously meeting predefined hardware component life requirements.

Gas turbine control systems typically receive as inputs various operating parameters and settings that, in conjunction with the scheduling algorithms, determine turbine control settings to achieve the desired operational mode or condition while still meeting hardware component life requirements. Measured or sensed operating parameters may include, but are not limited to, compressor inlet pressure and temperature, compressor exit pressure and temperature, turbine exhaust temperature, and generator power output. Desired operational modes or conditions may include, but are not limited to, full-speed full-load, base-load and turndown operation of the gas turbine. The operational modes are generally determined by one or more of desired generator power output, emissions limits and/or exhaust energy requirements such as for a combined cycle power plant which includes a heat recovery steam generator.

The scheduling algorithms (e.g., exhaust temperature vs. compressor pressure ratio, fuel splits vs. combustion reference temperature, inlet bleed heat vs. inlet guide vane (IGV) position, compressor operating limit line vs. corrected speed and IGV position, etc.) may be typically defined to protect the gas turbine against known operational boundaries or limits (e.g., emissions requirements, combustor dynamics, lean-blow-out, compressor surge, compressor icing, compressor clearances, aero-mechanical, etc.). The scheduling algorithms are typically based, at least in part, on off-line field tests, predefined design constraints and/or laboratory data.

Forcing strict operational compliance with a rigid schedule-based and/or model-based control system may result in economic performance loss at various operating modes such as at base load, full-speed full-load or turndown of the gas turbine, thus potentially affecting the overall economic benefits or potential profits of the gas turbine based power plant facility. Thus, there exists a need for a system and method for operating a gas turbine based power plant which allows an owner/operator the ability to evaluate the potential hardware component life effects of operating the gas turbine outside of the pre-defined scheduling algorithms based on a real-time or near-real time component hardware wear.

BRIEF DESCRIPTION OF THE INVENTION

Aspects and advantages of the invention are set forth below in the following description, or may be obvious from the description, or may be learned through practice of the invention.

One embodiment of the present invention is a system for controlling a gas turbine based power plant. The system includes a plurality of sensors where each sensor is configured to sense and communicate or transmit a signal which is indicative of an operating parameter of the gas turbine. The system further includes a control system which includes a computing device. The computing device is in electronic communication with each sensor of the plurality sensors. The control system is configured to receive the signals from the sensors, compute cumulative wear for one or more hardware components of the gas turbine based at least in part on one or more of the signals via the computing device, receive input instructions such as from an operator which are indicative of a desired operational mode for the gas turbine, compute a hardware consumption rate for the hardware component based at least in part on the cumulative wear and the desired operation mode via the computing device and display the hardware consumption rate to an operator via a display device.

Another embodiment of the present invention is a method for controlling a gas turbine based power plant. The method includes computing cumulative wear for a hardware component of the gas turbine based at least in part on one or more sensed operating parameters via a computing device of a control system and inputting into the control system a desired operation mode for the gas turbine. The method may also include computing a hardware consumption rate for the corresponding hardware component based at least in part on the cumulative wear and one or more of the operating parameter and one or more output parameters of the desired operation mode via the computing device. The method may further include providing the hardware consumption rate to an operator via a display device.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a gas turbine based power plant for purposes of illustration, one of ordinary skill in the art will readily appreciate that embodiments of the present invention may be applied to any turbomachine based power plant such as an aircraft gas turbine and/or a marine based gas turbine are not limited to any particular turbomachine unless specifically recited in the claims.

Various factors affect the profitability or economics of a gas turbine based power plant facility. In particular, maintenance costs and availability of the power plant to provide electricity to the grid are two of the most important financial concerns to an owner and/or operator of a heavy-duty gas turbine based power plant. Therefore, advanced planning for maintenance outages is necessary to reduce outage time and to prevent unscheduled or forced outages. Some of the primary factors which affect the maintenance planning process include an owners' operating mode or power production requirements, operating practices, emissions constraints and the design limits of various hardware components.

As stated herein, operating mode and/or operating practices are heavily influenced by the design limits of each individual hardware component, particularly those that are associated with the combustion process and/or those that come into contact with combustion gases are of the greatest expense and concern to an owner/operator. For example, parts of the combustion system generally include fuel nozzle assemblies, combustion liners, transition ducts, flow sleeves, impingement sleeves and cross fire tubes. Components of the turbine that come into contact with the hot combustion gases generally include stator vanes, stationary shrouds and rotor blades. Each of these components requires careful attention and has a direct effect on the maintenance schedule of and the cost to own/operate the gas turbine due to various factors including thermal mechanical fatigue, creep and/or combustion dynamics. The expected or designed life of these hardware components is generally defined in terms of operating hours as well as number of cycles or stops and starts.

Scheduling algorithms of conventional gas turbine control systems determine settings for turbine control effectors or inputs that cause the turbine to operate within predetermined limits such as a predetermined firing schedule which may be heavily influenced by the design limits of the individual hardware components. Typically, the scheduling algorithms protect against worst-case scenarios and have built-in assumptions based on certain operating states which attempt to maximize or optimize the time between maintenance intervals. However, there may be times when an operator would prefer to optimize the immediate economics or profitability of the power plant at the expense of hardware component life. The system and method disclosed herein generally provide for operating the gas turbine based power plant based on a real-time or near real-time hardware consumption rate rather than controlling the gas turbine based on rigid conventional control schedules, thereby allowing an operator to optimize the overall economics of the gas turbine with a clear understanding of the potential impact to hardware life and the time remaining between maintenance intervals.

Figure 1:
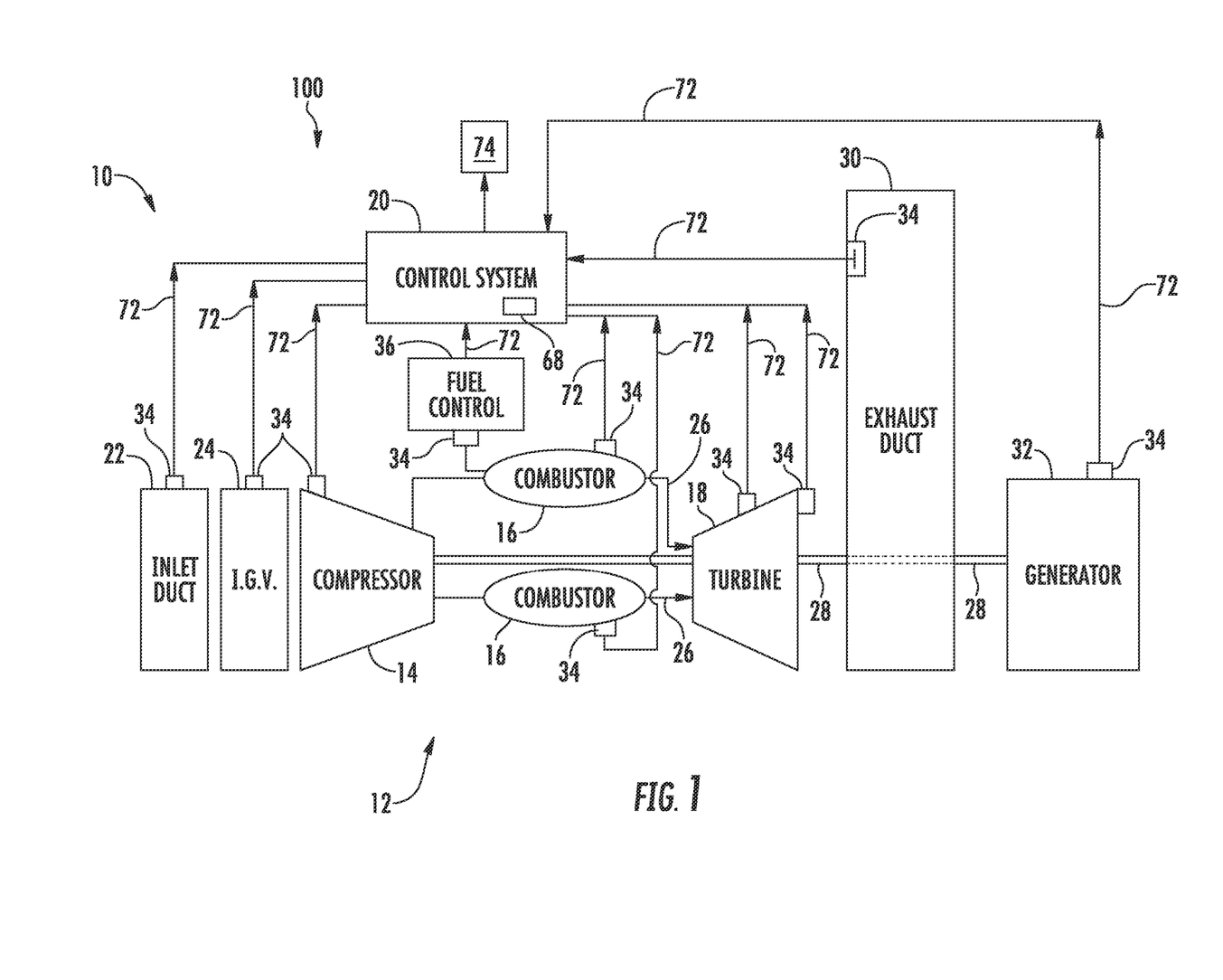
FIG. 1 is a functional block diagram of an exemplary gas turbine based power plant within the scope of the present disclosure.

With regards to the figures, FIG. 1 is a schematic diagram of a gas turbine based power plant 10 including a gas turbine 12, a compressor 14, a combustion system including one or more combustors 16 downstream from the compressor 14, a turbine 18 downstream from the combustors 16 and drivingly coupled to the compressor 14, and a controller or control system 20. In one configuration, an inlet duct 22 channels ambient air across one or more inlet guide vanes 24 and into the compressor 14. The compressor 14 progressively compresses the ambient air and directs the compressed air to the combustors 16 where it is mixed with a fuel and burned to produce combustion gases 26. The combustion gases 26 are routed through the turbine 18, thus causing rotation of a shaft 28. The combustion gases 26 may then be routed from an outlet of the turbine 18 into an exhaust duct 30 that may include various emission control and/or sound absorbing devices and/or a heat recovery system such as a heat recovery steam generator (not shown). The turbine 18 may drive a generator 32 via the shaft 28 to produce electrical power.

In particular configurations, various sensors 34 are electronically coupled to the control system 20. The sensors 34 may include flow sensors, speed sensors, flame detector sensors, valve position sensors, guide vane angle sensors, temperature sensors, acoustic sensors, pressure sensors and/or other sensors that sense various operating parameters relative to the operation of the combustors 16 and/or the gas turbine 12. A fuel control system 36 may be provided to regulate fuel flowing to the combustors 16. The fuel control system 36 may control fuel splits between fuel circuits within each combustor 16 that allow for flow control of the fuel into various fuel nozzles within each combustor 14. The fuel control system 36 also may select fuel type or composition for combustion in the combustors 16 and/or regulate the temperature of the fuel among other operations. The fuel control system 36 may be a separate unit or may be a component of the control system 20.

Figure 2:
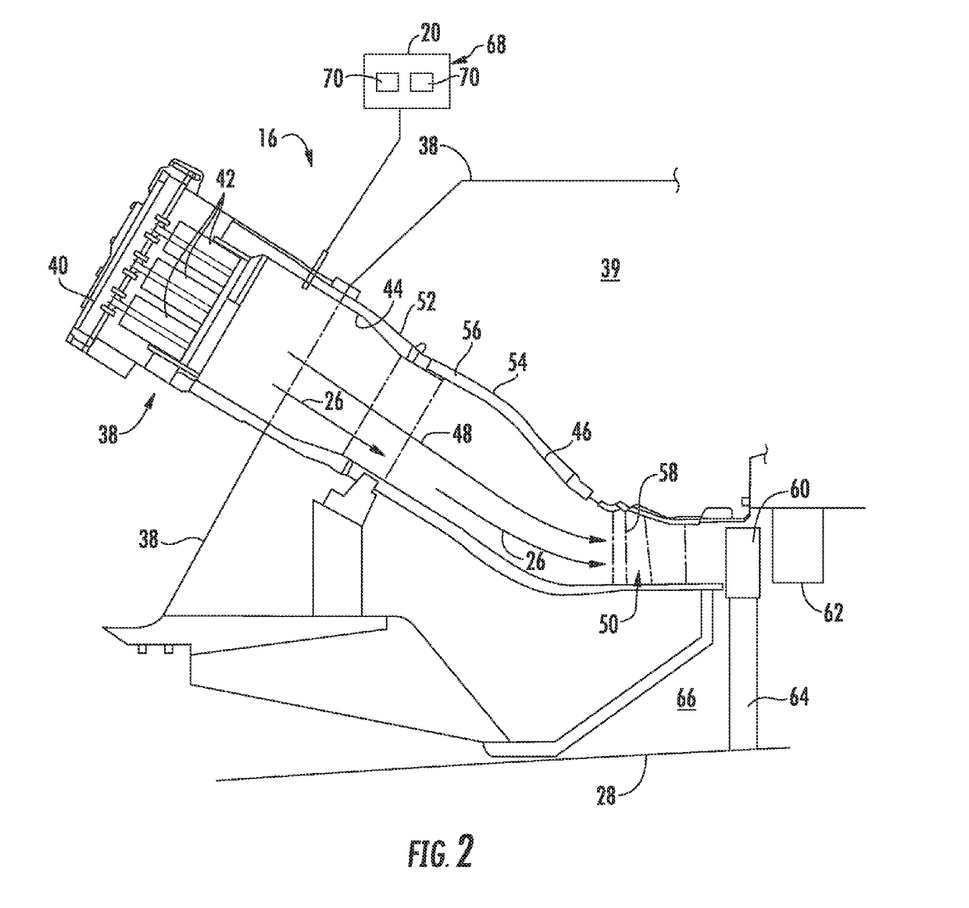
FIG. 2 is a cross sectioned side view of an exemplary combustor as may incorporate various embodiments of the present disclosure.

FIG. 2 provides a cross sectional side view of an exemplary combustor 16 as may incorporate various embodiments of the present invention. As shown, the combustor 16 is at least partially surrounded by a compressor discharge or outer casing 38. An end cover 40 may be coupled to the compressor discharge casing 38. The compressor discharge casing 38 generally forms a high pressure plenum 39 which at least partially surrounds the combustors 16. The high pressure plenum 39 is in fluid communication with the compressor 14.

Various hardware components are disposed within the outer casing 38. For example, the hardware components generally include one or more fuel nozzles 42 extending generally axially downstream from the end cover 40. One or more annular liners such as a combustion liner 44 and/or a transition duct 46 extend downstream from the fuel nozzles 42 so as to define a hot gas path 48 through the compressor discharge casing 38 for routing the hot combustion gases 26 towards an inlet 50 to the turbine 18. An annular flow sleeve 52 may at least partially surround the combustion liner 44 and an annular impingement sleeve 54 may least partially surround the transition duct 46 so as to form an annular cooling flow passage 56 therebetween. A stage or row of stationary or stator vanes 58 may be disposed at the turbine inlet 50.

The turbine 18 generally includes various hardware components which come into direct or indirect contact with the hot combustion gases 26 as well. For example, the hardware components of the turbine 18 may include but are not limited to one or more rows or stages of rotatable turbine blades 60 and one or more rows of stationary or stator vanes 62. The turbine blades 60 may be coupled to the shaft 28 via one or more rotor disks 64 which extend radially outwardly from the shaft 28. During operation, compressed air from the compressor 16 and/or a cooling medium such as steam may be routed into various voids defined between adjacent rotor disks 64 herein referred to as wheel space 66 and/or into various cooling flow paths defined within the turbine rotor blades 60 and/or the stationary vanes 58, 62 for cooling of those hardware components or voids.

The control system 20 as is described herein, may include one or more processors or processing units, system memory, and some form of computer readable media. For example, in various embodiments, the control system 20 includes a computing system or device 68 having at least one processor 70 that executes programs and operations to control the operation of the gas turbine 12 using sensor inputs, scheduling algorithms, control models and/or instructions from human operators. The programs and operations executed by the control system 20 may include, among others, sensing and/or modeling operating parameters, operational boundaries, applying operational boundary models, applying scheduling algorithms and applying boundary control logic.

In one embodiment, as illustrated in FIG. 1, the control system 20 is configured to receive signals 72 from one or more of the sensors 34 which monitor the operation of the gas turbine 12. In various embodiments, the sensors 34 may be configured to sense or detect various operational parameters of the gas turbine 12 and communicate or transmit those signals 72 which are indicative of the operational parameters back to the control system 20 and/or the computing device. In various embodiments, the sensors 34 may comprise of temperature sensors that monitor ambient temperature surrounding the gas turbine 12, fuel temperature, compressor discharge temperature, combustion gas temperature at the stationary vane 58 or inlet to the turbine 18, combustion gas temperature at various stages within the turbine 18, cooling air or medium flow temperature to wheel space 66 and/or turbine hardware components and turbine exhaust gas temperature.

Similarly, in particular embodiments, the sensors 34 may include various pressure sensors that monitor or sense at least one of ambient pressure, static and dynamic pressure levels at the compressor inlet and outlet, pressure within the compressor discharge casing, pressure at the turbine exhaust and at other locations in the hot gas path 48 through the gas turbine 12. In addition or in the alternative, the sensors 34 may include various humidity sensors, for example, wet and dry bulb thermometers, that measure ambient humidity at the inlet duct 22 of the compressor 14. The sensors 34 may also detect or sense generator output. The sensors 34 may also include flow sensors, speed sensors, flame detector sensors, valve position sensors, guide vane angle sensors, or the like, that sense various operational parameters pertinent to the operation of the gas turbine 12 and/or the gas turbine based power plant 10. As used herein, "operational parameters" refers to items that can be used to define operating conditions of the gas turbine 12, such as temperatures, pressures, and gas flows at defined locations in the gas turbine 12.

In one embodiment, as shown in FIG. 1, the control system 20 includes a display device 74. The display device 74 may be, for example, a capacitive touch screen display that is integrated into the control system 20 or that is external to the control system 20. User input functionality may be provided in the display device 74 which acts as a user input selection device. In particular embodiments, the display may include a mobile communication device such as but not limited to a smart phone, a tablet, a lap-top computer or the like.

In one embodiment, a system 100 for controlling the gas turbine based power plant 10 is provided. The system 100 includes a plurality of the sensors 34 where each sensor 34 is configured to sense and/or communicate a signal 72 which is indicative of an operating parameter of the gas turbine 12 to the control system 20. For example, in particular embodiments, the sensors 34 may be configured to sense operating parameters such as temperatures, pressures, and/or gas flows at defined locations in and/or around the gas turbine 12.

The sensors 34 may be disposed within or to one or more portions of the gas turbine 12. For example, the sensors 34 may be connected to and/or placed within any one or any combination of the inlet duct 22, the compressor 14, the compressor discharge casing 38, the combustors 16, the fuel control system 36, the turbine inlet 50, the turbine 18, the exhaust duct 30, the hot gas path 48, the generator 32 or may be setup or disposed so as to sense ambient conditions around the gas turbine 12. In one embodiment, the sensors 34 are configured to sense, monitor or detect at least one of compressor discharge temperature, combustion gas temperature, cooling medium temperature and exhaust gas temperature. In one embodiment, the sensors 34 are configured to sense, monitor or detect ambient conditions at the inlet 22 to the gas turbine 12, fuel temperature, fuel composition, wheel space 66 temperature, combustion dynamics and combustor type.

In particular embodiments, the system 100 further includes the control system 20 including the computing device 68 which is in electronic communication with each of the sensors 34. The control system 20 and/or the computing device 68 are configured to receive the signals 72 from the sensors 34. For example, the sensors 34 may be connected to the control system 20 and/or the computing device 68 via various wired connections, connectors or the like. In addition or in the alternative, the sensors 34 may be in electronic communication with the control system 20 and/or the computing device 68 via a wireless connection.

In particular embodiments, the control system 20 and/or the computing device 68 are configured to compute cumulative wear for one or more hardware components of the combustor 16 and/or the turbine 18 via one or more executable algorithms based at least in part on one or more of the signals 72 provided by the sensors 34 where the signals are indicative of one or more operating parameters of the gas turbine. The term "cumulative wear" as used herein, refers to thermal, mechanical and other life limiting wear which reduces a hardware components remaining or useful life. Cumulative wear may be determined at least in part based on an initial condition or known hours of use of a particular hardware component. For example, a new hardware component would have no cumulative wear. As the hardware component is used, the cumulative wear increases.

In one embodiment, the control system 20 and/or the computing device 68 may be programmed to execute one or more algorithms which provide for real-time or near real-time damage summation using standard lifting techniques such as but not limited to damage integrals, rainflow counting and Miner's rule, which may then be used to integrate the cumulative wear and provide an estimate of remaining useful life. In particular embodiments, the control system 20 and/or the computing device 68 are programmed with one or more physics based hardware component life models of at least one of the one or more hardware components of the gas turbine 12. As such, in particular embodiments, the cumulative wear may be at least partially calculated or estimated based at least in part on the physics based hardware component life models.

In particular embodiments, the control system 20, the computing device 68 and/or the display device 74 are configured to receive input instructions which are indicative of a desired operational mode for the gas turbine 12. For example, the desired operational mode may include full-speed full-load, base-load, turndown, start-up or shut down modes of operation for the gas turbine 12. The desired operational mode may be at least partially based on one or more power plant economic objectives. In various embodiments, the economic objectives may include but are not limited to power plant output, efficiency, hardware component repair costs, risk of unplanned outage, plant startup time and/or emissions.

In particular embodiments, the control system 20 and/or the computing device 68 are configured to compute a hardware consumption rate via one or more executable algorithms which are based at least in part on the cumulative wear of one or more of the hardware components and the desired operational mode. In one embodiment, the hardware consumption rate may be at least partially based on one or more output parameters of the desired operation mode such as power output. In one embodiment, the hardware consumption rate may be at least partially based on the physics based hardware component life models.

The hardware consumption rate algorithm may be based on one or more of firing temperature within the combustors 16, combustion gas temperature within the turbine 18, cooling air supply temperature, turbine exhaust temperature, ambient conditions surrounding the gas turbine 12, fuel temperature, fuel splits, fuel quality or composition, compressor discharge temperature, wheel space temperature, combustion dynamics, combustor type, operational data from the heat recovery steam generator such as steam temperature, generator output and hardware component design limitations previously stored in or provided to the control system 20.

In particular embodiments, the control system 20 and/or the computing device 68 are configured to display the hardware consumption rate in real-time and/or near real-time or at any requested time to an interested party such as an operator and/or owner via the display device 74 or other display unit such as a LCD or CRT monitor and/or remotely via a wired means such as the internet or via various wireless means such as a cellular telephone, smart phone, tablet or PDA through text messaging, email, wireless network or the like.

In particular embodiments, the hardware consumption rate may be displayed at the display device 74 as a numerical or other value. For example, a hardware consumption rate of 1.0 may indicate that a particular power output selection or desired operation mode would have no adverse or accelerated effect on the life of the various hardware components. A hardware consumption rate of greater than 1.0 such as 1.1 may indicate an accelerated effect on the hardware component or components, thus decreasing the time between maintenance intervals. Similarly, a hardware consumption rate of less than 1.0 such as 0.9 may indicate a decelerated effect on the hardware component life, thus increasing the time between maintenance intervals.

The system 100 provided herein provides an owner and/or operator a real-time or near real-time tool for analyzing various economic and/or other factors such as fuel costs, impact on gas turbine availability, outage schedules, future maintenance costs, current price of power, impact to customer profit and revenue stream based the hardware consumption rate, and adjusting or selecting the desired operating mode of the gas turbine and/or power plant. For example, based on the hardware consumption rate and any of the economic and/or other factors mentioned above, the operator may choose to run the gas turbine in a mode that produces higher power at the expense of hardware life to increase revenue for the power plant or to meet a critical customer demand. In the alternative, the operator may choose to operate in a mode that extends the life of the hardware, thus saving costs related to maintenance, repair and outage time.

In addition to providing the hardware consumption rate, the control system 20 also may use data received relating to the various operating parameters from the various sensors 34 of the gas turbine 12 alone or in conjunction with various engineering or design limit inputs to execute an algorithm that calculates remaining life of each or some of the various hardware components. For example, a remaining life algorithm may be based on one or more of firing temperature within the combustors 16, combustion gas temperature within the turbine 18, turbine exhaust temperature, ambient conditions surrounding the gas turbine 12, fuel split data, fuel temperature, fuel quality or composition, compressor discharge temperature, wheel space temperature, combustion dynamics, percentage of full load, combustor type, material composition of the various hardware components, historical life data and physics based life estimates of the various hardware components.

Figure 3:
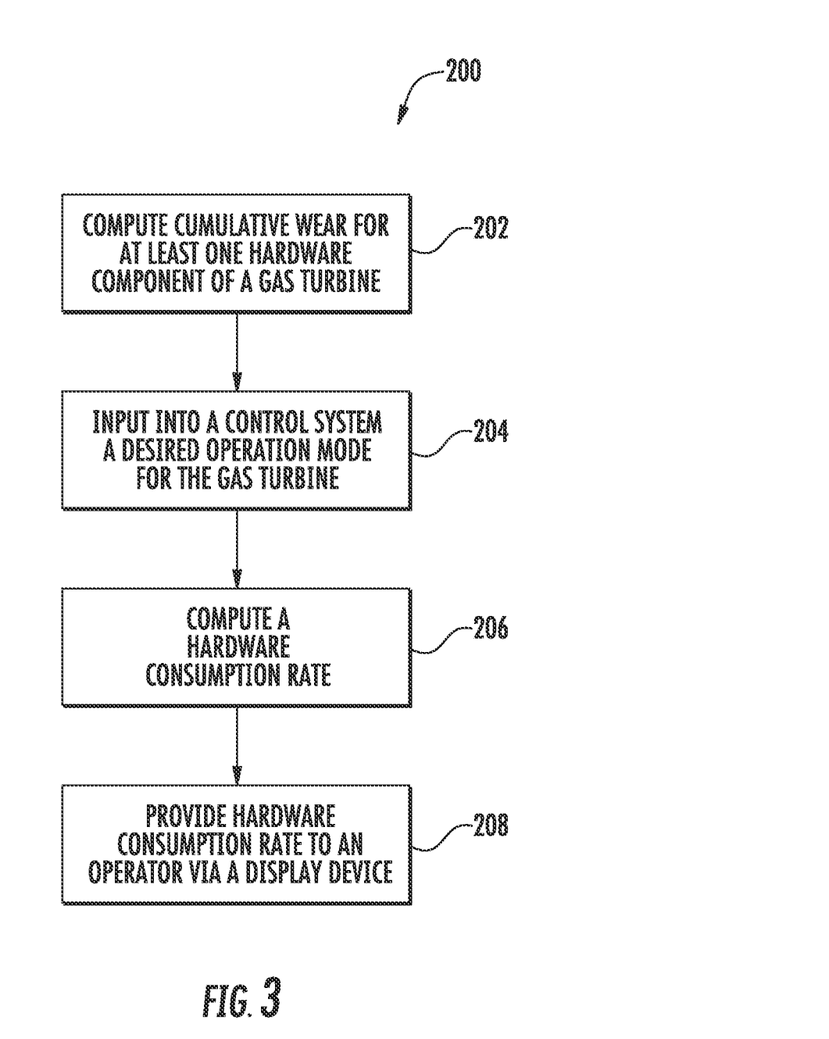
FIG. 3 provides a flow diagram of an exemplary method for operating a gas turbine based power plant according to one or more embodiments of the present invention.

In at least one embodiment, as illustrated in FIG. 3, the system 100 provides a method 200 for controlling the operation of a gas turbine based power plant 10. As shown in FIG. 3 at 202, method 200 includes computing or calculating cumulative wear for at least one hardware component of the gas turbine 12 based at least in part on the one or more sensed operating parameters via the computing device 68 of the control system 20. In one embodiment the sensed operating parameters includes at least one of compressor discharge temperature, combustion gas temperature, cooling medium temperature and exhaust gas temperature. In one embodiment, the one or more sensed operating parameters includes at least one of ambient conditions at an inlet to the gas turbine, fuel temperature, fuel quality or composition, wheel space temperature, combustion dynamics and combustor type. In one embodiment, the hardware component of the gas turbine 12 is one of the combustion liner 44, the transition duct 46, a fuel nozzle 42, a stationary turbine vane 58 or a turbine blade 60. In one embodiment, the cumulative wear is based at least partially on a physics based hardware life model of the component of the gas turbine.

At 204, method 200 includes inputting into the control system 20 a desired operation mode for the gas turbine 12. For example, an operator may desire to operate the gas turbine 12 at base load, full speed full load, turn down or some other operating mode. At 206, method 200 includes computing or calculating via the computing device 68 and/or the control system 20 a hardware consumption rate for the at least one hardware component based at least in part on the cumulative wear and the desired operation mode. In one embodiment, the hardware consumption rate is based at least in part on one or more output parameters associated with the desired operation mode of the gas turbine 12 such as but not limited to generator power output. At 208 the method 200 includes providing the hardware consumption rate to an operator via display device 74.

In further embodiments, the method 200 may include selecting the desired operation mode based on the hardware consumption rate. In further embodiments, method 200 may include selecting a different desired operation mode based on the hardware consumption rate, computing a second hardware consumption rate based at least in part on the cumulative wear via the computing device and providing the second hardware consumption rate to the operator via the display device 74. In addition or in the alternative, method 200 may include selecting the desired operating mode for the gas turbine based at least in part on the hardware consumption rate and one or more power plant economic objectives. For example, in one embodiment the power plant economic objectives may include at least one of remaining hardware component life, gas turbine outage schedule, power plant output, heat rate of the gas turbine and power plant emissions compliance.

In other embodiments, method 200 may include simultaneously displaying various hardware consumption rates that correspond to various power output options within a pre-specified range of an operators desired operation mode via the display device 74. In addition or in the alternative, method 200 may further include comparing and/or analyzing various economic and/or other factors such as fuel costs, impact on gas turbine availability, outage schedules, future maintenance costs, current price of power, impact to customer profit and revenue stream based the hardware consumption rate, and adjusting or selecting the desired operating mode of the gas turbine and/or power plant. For example, based on the hardware consumption rate and any of the economic and/or other factors mentioned above, the operator may choose to run the gas turbine in a mode that produces higher power at the expense of hardware life to increase revenue for the power plant or to meet a critical customer demand. In the alternative, the operator may choose to operate in a mode that extends the life of the hardware, thus saving costs related to maintenance, repair and outage time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling a gas turbine, comprising:
a plurality of sensors, each sensor being configured to sense and communicate a signal indicative of an operating parameter of the gas turbine;
a control system including a computing device in electronic communication with each sensor of the plurality sensors, wherein the control system is configured to:
receive the signals from the sensors, at least one of the signals being indicative of a fuel parameter;
compute cumulative wear for one or more hardware components of the gas turbine based at least in part on the fuel parameter and a combustor type of the gas turbine via the computing device;
receive input instructions selecting a desired operating mode for the gas turbine;
compute a hardware consumption rate based at least in part on the cumulative wear and the desired operating mode via the computing device;
display the hardware consumption rate to an operator via a display device that is in electronic communication with the control system; and
adjust the desired operating mode of the gas turbine based at least in part on the hardware consumption rate and a cost of fuel.

2. The system as in claim 1, wherein the desired operating mode is based at least in part on one or more power plant economic objectives.

3. The system as in claim 2, wherein the power plant economic objectives include at least one of remaining hardware component life, gas turbine outage schedule, power plant output, heat rate of the gas turbine and power plant emissions compliance.

4. The system as in claim 1, wherein the computing device includes one or more physics based hardware life models of the at least one of the one or more hardware components of the gas turbine.

5. The system as in claim 4, wherein at least one of the cumulative wear and the hardware consumption rate is based at least partially on one or more of the one or more physics based hardware component life models.

6. The system as in claim 1, wherein the hardware component of the gas turbine is one of a combustion liner, a transition duct, a fuel nozzle, a stationary turbine vane or a turbine blade.

7. The system as in claim 1, wherein the one or more sensed operating parameters of the gas turbine includes at least one of compressor discharge temperature, combustion gas temperature, cooling medium temperature and exhaust gas temperature.

8. The system as in claim 1, wherein the hardware consumption rate is based at least in part on one or more output parameters associated with the desired operating mode, wherein the one or more output parameters includes generator power output.

9. The system as in claim 1, wherein the fuel parameter comprises at least one of a fuel temperature or a fuel composition.

10. The system as in claim 1, wherein the control system is further configured to compute the hardware consumption rate based at least in part on the cumulative wear, the desired operating mode, and operational data from a heat steam recovery generator.

11. A method for controlling a gas turbine, comprising:
computing cumulative wear for a hardware component of the gas turbine based at least in part on a fuel parameter and a combustor type of the gas turbine via a computing device of a control system;
inputting into the control system a desired operating mode for the gas turbine;
computing via the computing device a hardware consumption rate based at least in part on the cumulative wear and the desired operating mode;
providing the hardware consumption rate to an operator via a display device; and
adjusting the desired operating mode of the gas turbine based at least in part on the hardware consumption rate and a cost of fuel.

12. The method as in claim 11, further comprising selecting the desired operating mode based on the hardware consumption rate.

13. The method as in claim 11, further comprising selecting a different desired operating mode based on the hardware consumption rate, computing a second hardware consumption rate based at least in part on the cumulative wear and one or more output parameters of the desired operating mode via the computing device and providing the second hardware consumption rate to the operator via the display device.

14. The method as in claim 11, further comprising selecting or deselecting the desired operating mode for the gas turbine based at least in part on the hardware consumption rate and one or more power plant economic objectives.

15. The method as in claim 14, wherein the power plant economic objectives include at least one of remaining hardware component life, gas turbine outage schedule, power plant output, heat rate of the gas turbine and power plant emissions compliance.

16. The method as in claim 11, wherein the cumulative wear is based at least partially on a physics based hardware life model of the component of the gas turbine.

17. The method as in claim 11, wherein the one or more sensed operating parameters includes at least one of compressor discharge temperature, combustion gas temperature, cooling medium temperature and exhaust gas temperature.

18. The method as in claim 11, wherein the hardware consumption rate is based at least in part on one or more output parameters associated with the desired operating mode, wherein the one or more output parameters includes generator power output.

19. The method as in claim 11, wherein the one or more sensed operating parameters includes at least one of ambient conditions at an inlet to the gas turbine, fuel temperature, fuel quality or composition, wheel space temperature, and combustion dynamics.

20. A system for controlling a gas turbine, comprising:
a sensor configured to sense and communicate a signal indicative of a fuel parameter of the gas turbine; a control system including a computing device in electronic communication with the sensor, wherein the control system is configured to:
receive the signal indicative of the fuel parameter from the sensor;
compute cumulative wear for one or more hardware components of the gas turbine based on the fuel parameter via the computing device;
receive input instructions selecting a desired operating mode for the gas turbine;
compute a hardware consumption rate based at least in part on the cumulative wear and the desired operating mode via the computing device; and
adjust the desired operating mode of the gas turbine based at least in part on the hardware consumption rate and a cost of fuel.

* * * * *